Nov. 10, 1925.

R. H. ROOK 1,560,734

APPARATUS FOR LAYING CONCRETE

Filed May 29, 1922

Inventor:
Ross H. Rook.
By his Attorney

Patented Nov. 10, 1925.

1,560,734

UNITED STATES PATENT OFFICE.

ROSS H. ROOK, OF LOS ANGELES, CALIFORNIA, ASSIGNOR OF ONE-HALF TO LEROY W. REESE, OF LOS ANGELES, CALIFORNIA.

APPARATUS FOR LAYING CONCRETE.

Application filed May 29, 1922. Serial No. 564,444.

*To all whom it may concern:*

Be it known that I, Ross H. Rook, a citizen of the United States, residing at Los Angeles, in the county of Los Angeles, State of California, have invented new and useful Improvements in Apparatus for Laying Concrete, of which the following is a detailed specification.

In laying concrete, as for instance for concrete side-walk, it has in the past been the general custom to make up a mixture for a lower or base course relatively rich in mineral aggregate (crushed stone, sand, gravel, or the like); and then to lay a surface course of cement mortar—usually a mortar made of cement and fine sand, with a high proportion of cement. This upper course of cement mortar provides a finishing surface that may be tooled as desired.

My present invention has for its general objects the provision of improved apparatus, for laying such concrete with a saving of labor and a saving of cement, or both; and to those ends it contemplates a procedure wherein a single mix is made and laid in place, and is then so manipulated as to bring to the surface a certain predetermined excess quantity of cement or cement mortar to form the finishing course. The improved apparatus which my invention provides for the purpose will best appear from the following detailed description, reference for this purpose being had to the accompanying drawings, in which:—

Figure 1:
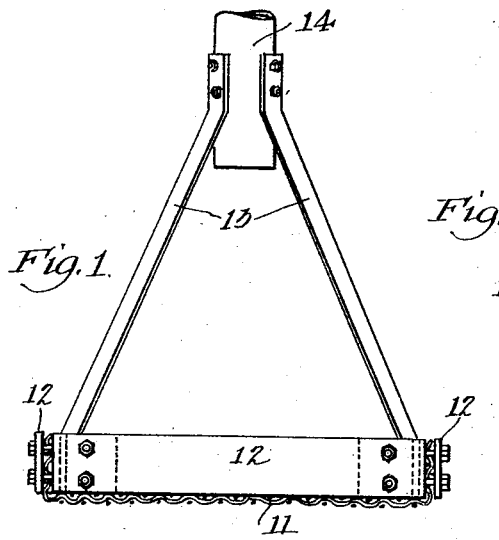
Figure 2:
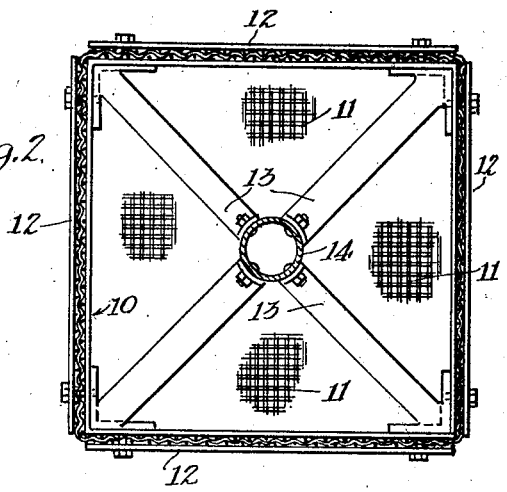
Figure 3:
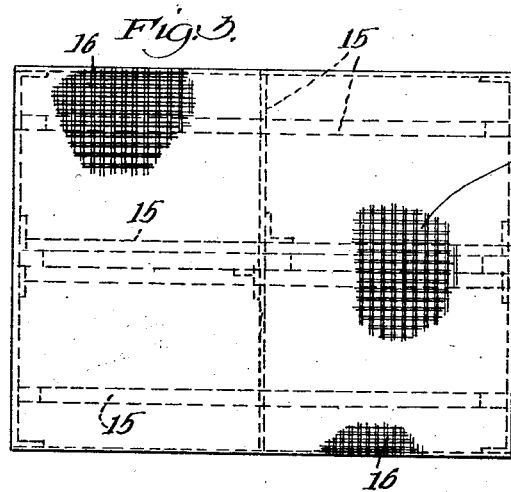
Figure 4:
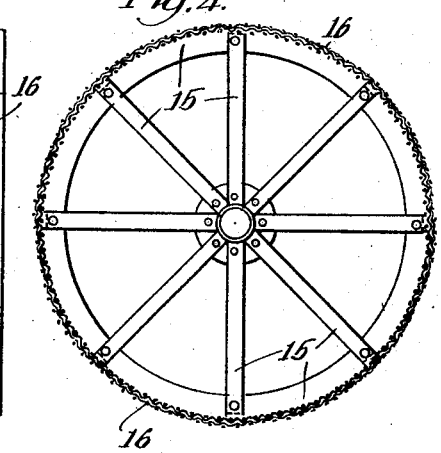
Figure 5:
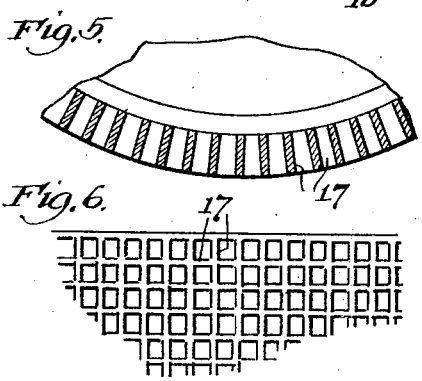
Figure 6:
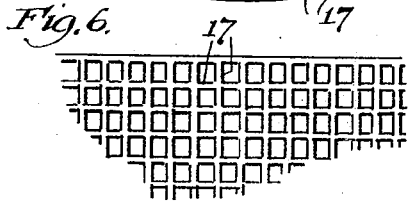
Figure 7:
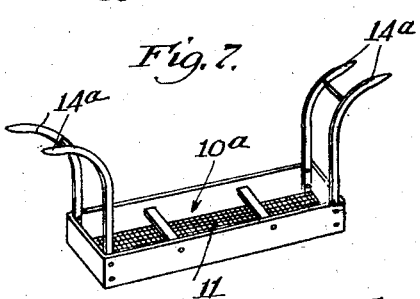

Fig. 1 is an elevation of a tamper; Fig. 2 is a plan of the same; Fig. 3 is a side elevation of a roller forming a modification of my invention; Fig. 4 is a vertical cross section of the same; Fig. 5 is a fragmentary section showing a modified form of roller; Fig. 6 is a fragmentary plan of the parts shown in Fig. 5; and Fig. 7 is a perspective of a modified form of tamper.

In making the concrete mixture for laying pavement according to my process, the mineral aggregate is selected with a view to obtaining a maximum inherent stability; that is, the mineral aggregates are so graded in size, and the proportional quantities of different sizes are so selected, as to make a mixture that has stability in itself. As an instance, not as a limitation of my invention, I may cite the following: The rock may be selected to all pass a one and one-half inch screen; not less than 90% to pass a one inch screen; at least 45% but not more than 65% shall pass a three-quarter inch screen; and not more than 3% shall pass a one-quarter inch screen; all by weight. The sand may be selected so that not less than 90% shall pass a one-quarter inch screen; at least 40% but not more than 80% shall be retained on a thirty mesh screen; at least 3%, but not more than 6% shall pass a two-hundred mesh screen; all by weight.

Now, a mixture made up of such selected rock and sand in proportions 2½ sand, 3½ rock by volume will give a mineral aggregate having about 20% of voids and also having an excess, amounting to about 25% of the total volume, of fine mortar forming mineral below the ¼" mesh size. In other words in this particular mixture there is more than enough of the finer sand to fill the voids in the coarser mineral aggregate so that we have left over a certain amount of the finer sand for the formation of the upper course mortar. On the other hand, if for instance, we take out of the above mentioned mixture a certain proportion of the finer sand particles we then have a mineral aggregate in which the voids of the coarser mineral particles are just filled with the finer mineral particles. Next, if we add to this last mentioned mixture just enough cement to fill all the remaining voids we then have a final mixture in which there would be no excess cement and no excess mortar. That would be, in that case, cement to the extent of a little less than 20% of the total volume of the stated aggregate. But in the invention we provide an excess of cement; and in this particular illustration if we then provide more than approximately 20% of cement we have then provided excess cement for the purpose of forming the upper finished course in the manner hereinafter stated. Going back again to the first defined mixture, that is, the mixture having the excess of fine mortar forming sand, then in that case when we provide just enough cement to fill all the voids of the whole mineral aggregate, including the filling of the voids in the excess fine mortar forming parts of the aggregate, we have then in essence provided an excess of motar composed of the finer parts of the sand and cement for the formation of an upper course.

The materials having been so selected, and having been indiscriminately mixed together and with water, they are then laid in place; and the excess of cement or of cement and sand mortar is then worked to the surface by compacting the relatively larger portions of the mineral aggregate, without compacting the cement or the fine cement mortar. This work of compacting the coarser parts of the mineral aggregate may be done with a tamper or roller or any other suitable instrumentality, provided with a concrete engaging face made of some foraminous material. Although any perforated material will do, I have found that wire screen is particularly effective. For instance, in Figs. 1 and 2 I show a tamper with a rectangular base frame 10 across the lower face of which a wire mesh screen 11 is secured, the lateral edges of the screen being bent upwardly and held in place against the outer face of frame 10, by clamping bars 12. Braces 13 connect with and support a handle 14. It will be understood, of course, that the tamper may be of any size, shape and made of any material and of any suitable weight; the details herein described are of no particular importance in my invention. The size of the wire mesh screen will depend quite entirely upon the class of work being done. The mesh of the screen should be, in any case, coarse enough to pass the coarsest of the sand particles that form a part of the excess mortar desired to be brought to the surface, but fine enough to press down all larger sizes of mineral matter. For instance, for working on a mixture such as above described, the wire mesh screen may be about one-eighth to one-quarter inch mesh. Tamping on the mixture with a tamper of this character causes the mineral aggregate to be compacted, and therefore forces to the surface the excess of cement or the excess of relatively fine cement mortar.

In Fig. 7 I have illustrated another form of tamper, with a longer frame 10$^a$ and with double handles, a handle 14$^a$ at each end—for operation by two men.

Instead of a tamper, it may be more convenient, especially on large jobs, to use a roller. Such a roller is shown, by way of illustration, in Figs. 3 and 4. Here we have a framework 15, skeleton in form, and the periphery of the roller is formed of wire screen 16 of suitable mesh. This roller may be made of any suitable size and weight, depending upon the character of the work being done; and if heavy work is being done, requiring the use of a heavy roller, instead of using a roller with a wire screen periphery, I may make a roller, say of cast iron or cast steel or the like, with a periphery formed foraminously with cross webs 17, as illustrated in Figs. 5 and 6. These webs may be of considerable radial depth, so as to be of comparatively great strength, to support a roller of comparatively great weight.

Having described a preferred form of my invention, I claim:

1. A tamper of the kind described, that comprises a hollow horizontal frame, a vertically extending handle connected to the frame, a screen forming the bottom of the tamper extending across the bottom of the frame and having its edges bent up on the outside of the frame, and cleats outside the screen edges and secured to the frame to hold the screen edge between the cleats and the frame.

2. A tamper of the kind described, that comprises a hollow horizontal frame, a vertical handle above the frame, braces connecting the handle with the frame, a screen forming the bottom of the tamper extending across the bottom of the frame and having its edges bent up on the outside of the frame, and cleats outside the screen edges and secured to the frame to hold the screen edges between the cleats and the frame.

3. A tamper of the kind described, that comprises a skeleton frame, a screen forming the bottom of the tamper extending across the bottom of the frame and having its edges bent up on the outside of the frame, and cleats outside the screen edges and secured to the frame to hold the screen edges between the cleats and the frame.

In witness that I claim the foregoing I have hereunto subscribed my name this 22nd day of May 1922.

ROSS H. ROOK.